(12) United States Patent
Liu et al.

(10) Patent No.: US 7,872,951 B2
(45) Date of Patent: Jan. 18, 2011

(54) ACTUATOR FOR OPTICAL PICKUP

(75) Inventors: Chin-Sung Liu, Hsinchu (TW);
Chang-Ming Tsai, Jhudong Township, Hsinchu County (TW)

(73) Assignee: TopRay Technologies Inc., Hsinchu (TW)

( * ) Notice: Subject to any disclaimer, the term of this patent is extended or adjusted under 35 U.S.C. 154(b) by 727 days.

(21) Appl. No.: 11/532,098

(22) Filed: Sep. 15, 2006

(65) Prior Publication Data
US 2007/0274169 A1 Nov. 29, 2007

(30) Foreign Application Priority Data
May 23, 2006 (TW) ............................... 95208899 U

(51) Int. Cl.
*G11B 7/00* (2006.01)
(52) U.S. Cl. .................................................. 369/44.14
(58) Field of Classification Search ................ 720/681, 720/683, 685; 369/53.19
See application file for complete search history.

(56) References Cited
U.S. PATENT DOCUMENTS
4,385,375 A * 5/1983 Okura et al. ................ 369/139
2002/0071189 A1 * 6/2002 Ohno ......................... 359/813
2004/0130978 A1 * 7/2004 Hatazawa ................ 369/44.22

FOREIGN PATENT DOCUMENTS
JP    2003141760 A  *  5/2003

* cited by examiner

Primary Examiner—Hoa T Nguyen
Assistant Examiner—Mark L Fischer

(57) ABSTRACT

An actuator capable of providing movement forces in a first direction, a second direction, and a third direction is provided. The actuator includes two sets of repelling permanent magnets and yokes, a focusing coil, a tracking coil, and a tilting coil. The repelling and attractive fields generated by the permanent magnets enable the coils to generate independent movements in three axial directions. The two sets of permanent magnets are placed in a repelling position, with a small space between the two magnets to generate a field whose magnetic forces repel and attract within the surrounding range. The focusing, tilting and tracking coils are engaged with the lens holder whose movements in the first, second and third directions are determined by the amplitude and direction of the electric current in the focusing, tilting and tracking coils respectively.

6 Claims, 8 Drawing Sheets

ACTUATOR FOR OPTICAL PICKUP

FIELD OF THE INVENTION

The present invention generally relates to an electromagnetic actuator, and more specifically to an electromagnetic actuator for optical pickup.

BACKGROUND OF THE INVENTION

Conventional optical storage media, such as CD, DVD, require a lens to focus the light source on a recording layer of the storage media to read and write data. The size of the recording spot is restricted by the optical diffractive property. To improve the recording density of the optical storage media, it is necessary to address the optical diffractive issues.

The optical pickup is the most important component in the optical storage device. The operation of an optical pickup includes projecting a laser beam to the surface of the media, and using an object lens to guide the reflected laser beam to an optical sensor for reading and writing. Because the media quality of different manufactures and the stability of a loading tray may vary, a playing device may be very selective and critical to the media quality and result in the discrimination of certain media.

An approach to solving the above problem is to allow a fine tuning of the object lens so that the laser beam can be precisely guided to the right angle for the optical pickup to perform the reading and writing correctly. The conventional approach is to connect the object lens to an actuator, which can provide the movement forces in both focusing direction and tracking direction for tuning the laser beam direction.

However, the conventional actuator fails to meet the demands of the reactive speed and the precision in the current application; therefore, it is important to develop an actuator to provide fast and precise movement forces to tune the lens.

SUMMARY OF THE INVENTION

The present invention has been made to overcome the above-mentioned drawback of a conventional actuator. The primary object of the present invention is to provide an actuator capable of providing movement forces in three directions so that the optical pickup can tune the reflected laser beam angle in a fast and precise manner.

To achieve the aforementioned object, the present invention provides an actuator capable of providing movement forces in a first direction, a second direction, and a third direction. The actuator includes two sets of repelling permanent magnets and yokes, a focusing coil, a tracking coil, and a tilting coil. The repelling and attractive fields generated by the permanent magnets enable the coils to generate independent movements in three axial directions.

The two sets of permanent magnets are placed in a repelling position, with a small space between the two magnets to generate a field whose magnetic forces repel and attract within the surrounding range.

The focusing coil is placed on the outer circumference of the permanent magnets, and is engaged to a lens holder. The size and the direction of the electric current in the focusing coil determine the movement of the lens holder in the first direction, which is defined as focus direction.

The tilting coil is placed on the outer circumference of the permanent magnets, next to the focusing coil, and is engaged to the lens holder. The size and the direction of the electric current in the focusing coil determine the movement of the lens holder in the second direction, which is defined as tilt direction.

The tracking coil is placed on the outer circumference of the focusing and tilting coils, and is engaged to a lens holder. The size and the direction of the electric current in the tracking coil determine the movement of the lens holder in the third direction, which is defined as track direction.

The experiments of the actuator of the present invention show that the average force for movement is ⅓ more than the conventional design. The increase in the exerted force increases the movement speed. In addition, the actuator of the present invention provides movement forces in three independent directions. In comparison, the actuator of the present invention is fast and precise in tuning the optical pickup to guide the laser beam to alleviate the selective and discriminative problem in the playing/recording devices.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
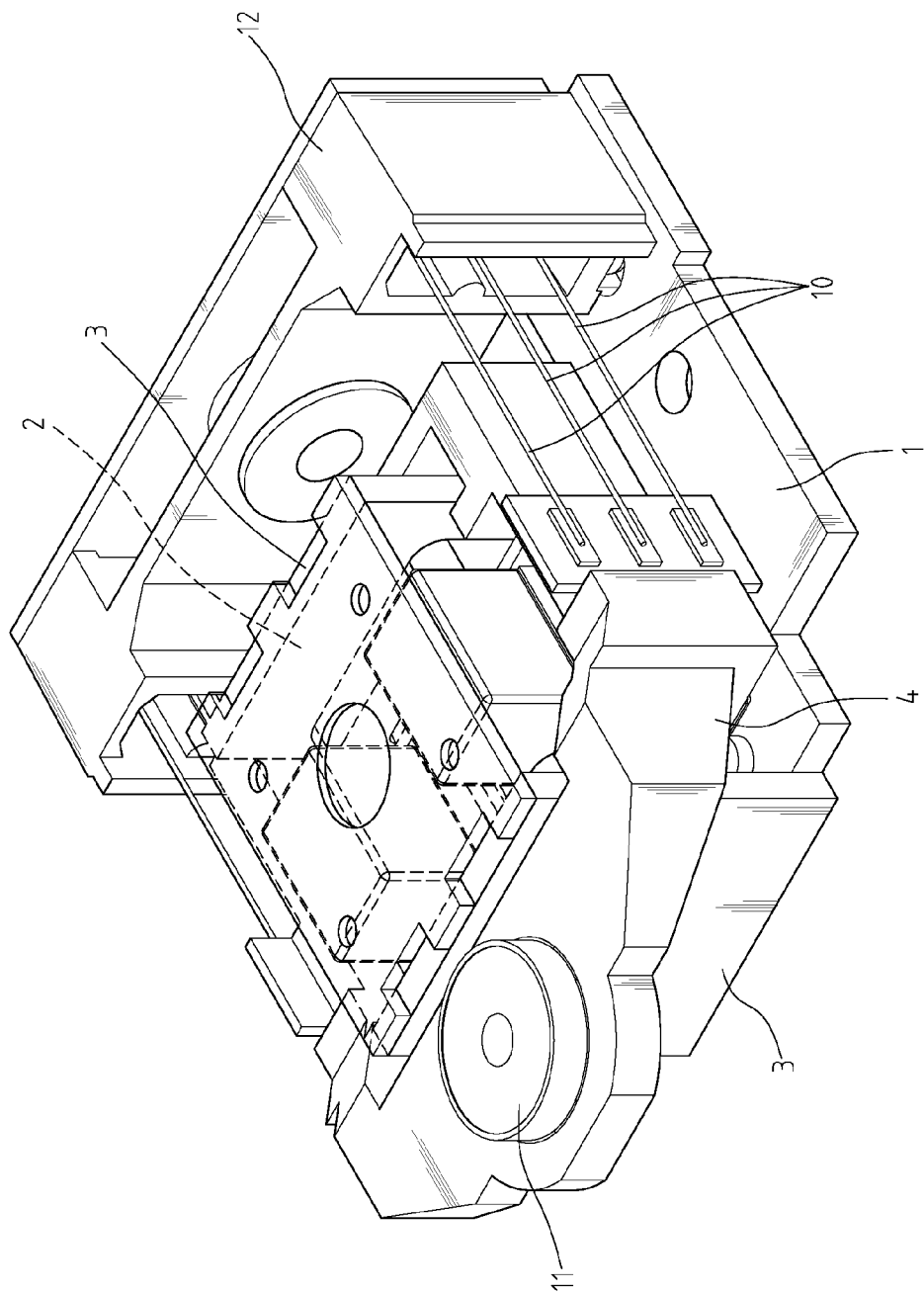
FIG. 1 shows a three-dimensional view of the present invention.
Figure 2:
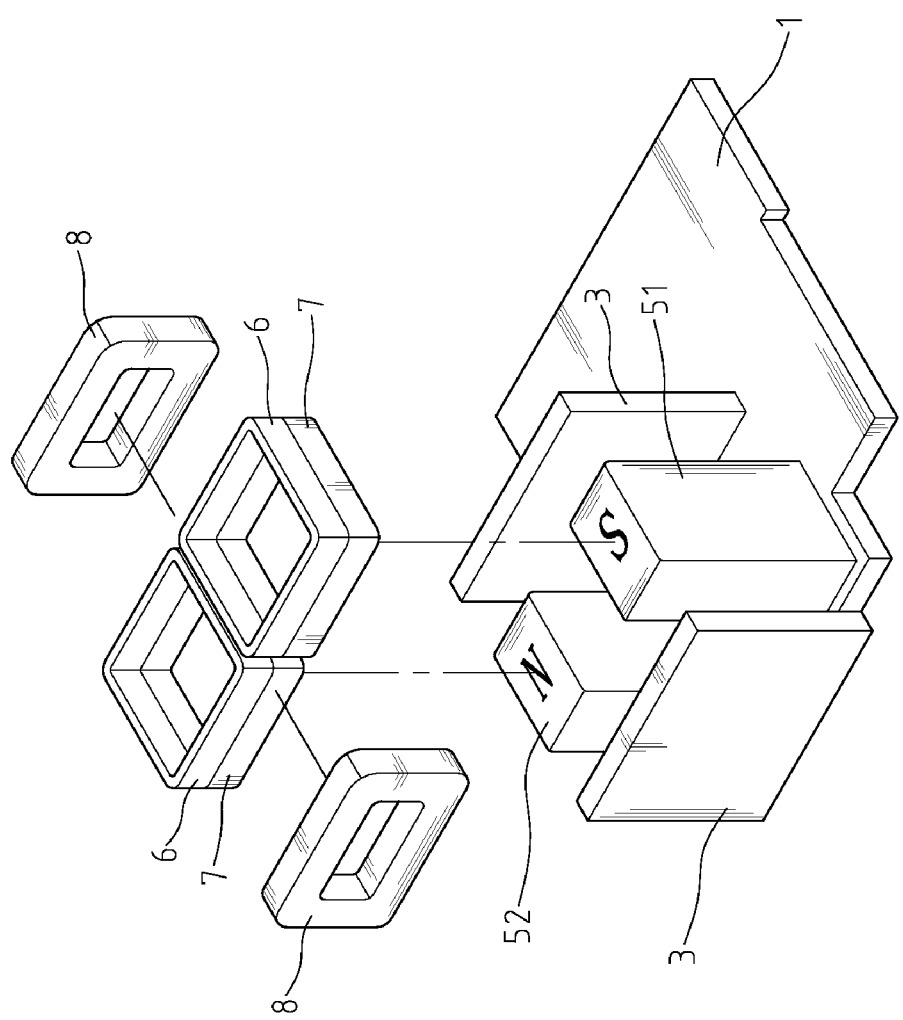
FIG. 2 shows an exploded view of the elements of the present invention.
Figure 3:
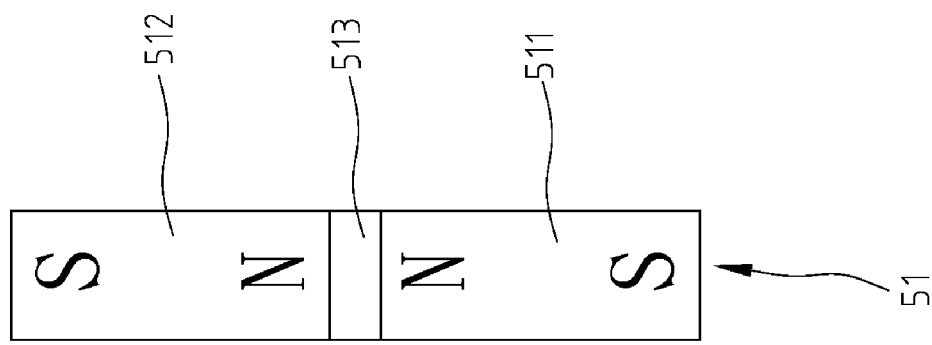
FIG. 3 shows a schematic view of the N-pole and S-pole of the magnets of the present invention.
Figure 3:
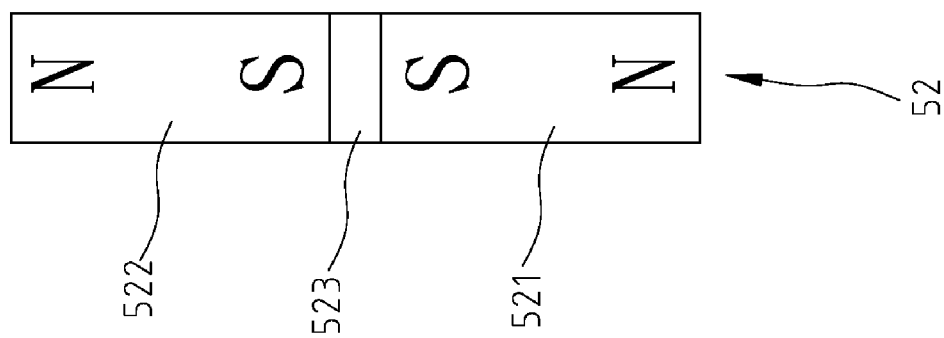

Refer to FIGS. 1-3. FIG. 1 shows the three-dimensional view of the present invention, FIG. 2 shows an exploded view of the elements of the present invention, and FIG. 3 shows a schematic view of the N-pole and S-pole of the magnets of the present invention. An actuator of the present invention includes a bottom yoke 1, a top yoke 2, a yoke pair 3, a lens holder 4, two pairs of permanent magnets 51, 52, a focusing coil 6, a tilting coil 7, a tracking coil 8, a steel wire set 10, a lens 11, and a base 12.

Bottom yoke 1 is connected to yoke pair 3 and base 12. The top of yoke pair 3 is connected to top yoke 2. Both sides of base 12 are connected to steel wire set 10, which is connected to lens holder 4 so that lens holder 4 is a hanging moveable object. Lens holder 4 holds lens 11.

Permanent magnet set 51 includes magnet 511, 512, and a yoke 513. Permanent magnet set 52 includes magnet 521, 522, and a yoke 523. Permanent magnet sets 51, 52 are next to each other with a small space in-between, and are placed on top of bottom yoke 1 and between yoke pair 3 for generating magnetic field.

Figure 4:
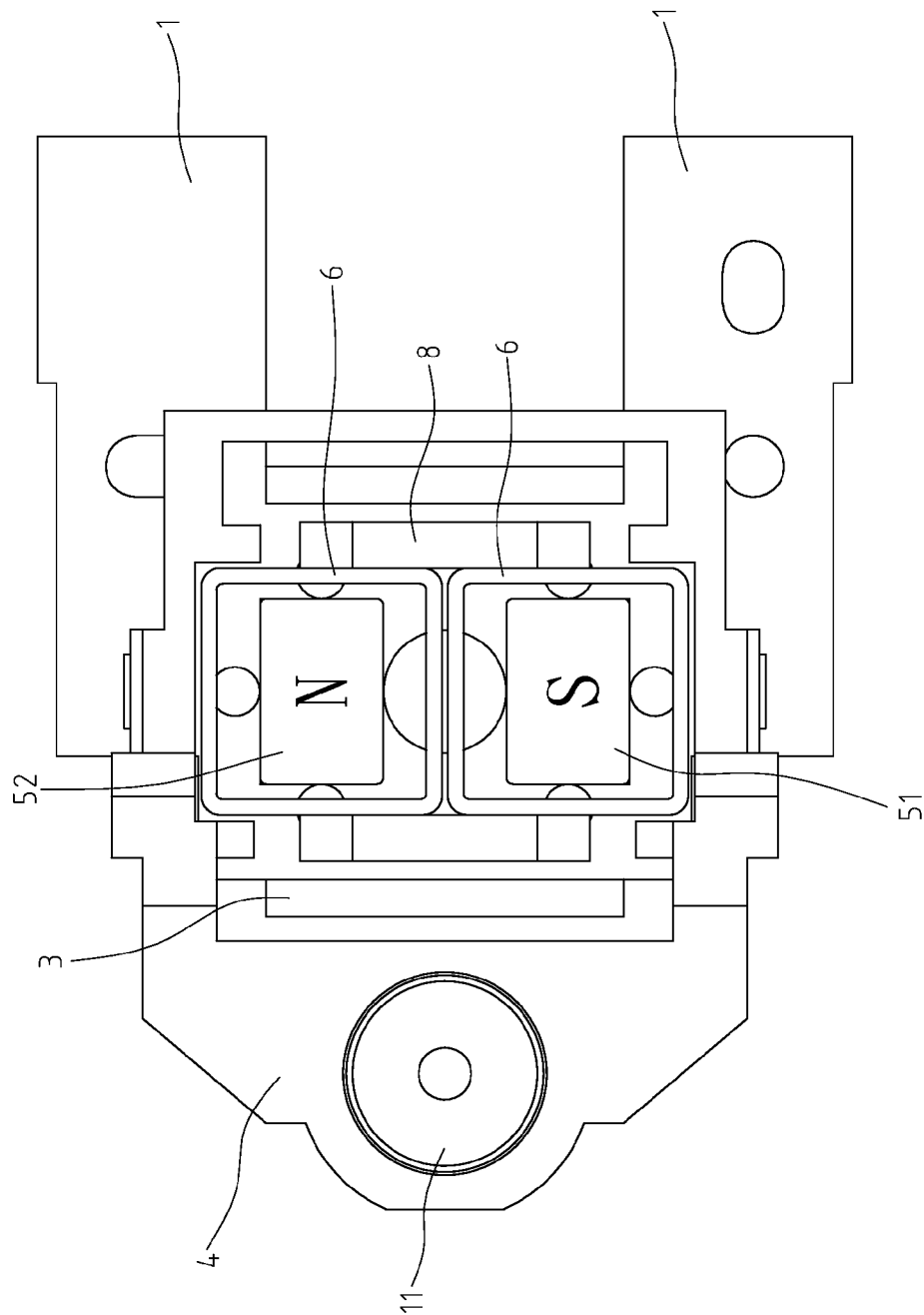
FIG. 4 shows a top view of the present invention.
Figure 5:
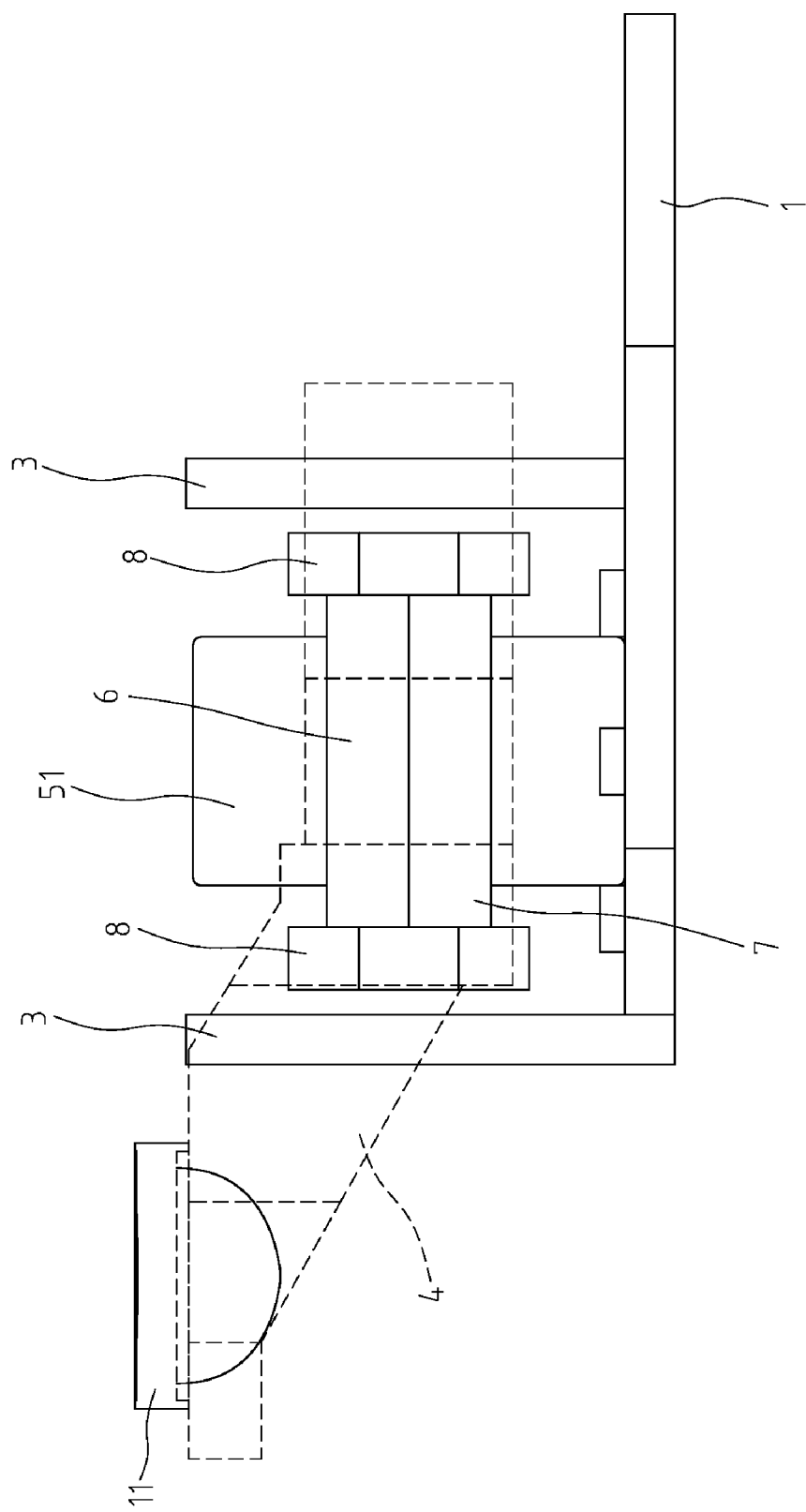
FIG. 5 shows a side view of the present invention.

Focusing coil 6 and tilting coil 7 are placed on the outer circumference of permanent magnet sets 51, 52. Tilting coil 7 is placed below and next to focusing coil 6. Tracking coil 8 is placed to the two sides of focusing coil 6 and tilting coil 7, closer to the inner side of yoke pair 3. Therefore, focusing coil 6, tilting coil 7 and tracking coil 8 are next to each other and the outer circumference of the three coils are attached to the inner edge of lens holder 4. Refer to FIG. 4 and FIG. 5. FIG. 4 is the top view and FIG. 5 is the side view of the present invention.

Focusing coil 6, tilting coil 7, tracking coil 8 are connected to lens holder 4, and lens holder 4 is a hanging moveable object. By controlling the direction and amplitude of electrical currents flowing through focusing coil 6, tilting coil 7, and tracking coil 8, the movement and movement direction of lens holder 4 is determined.

Figure 6:
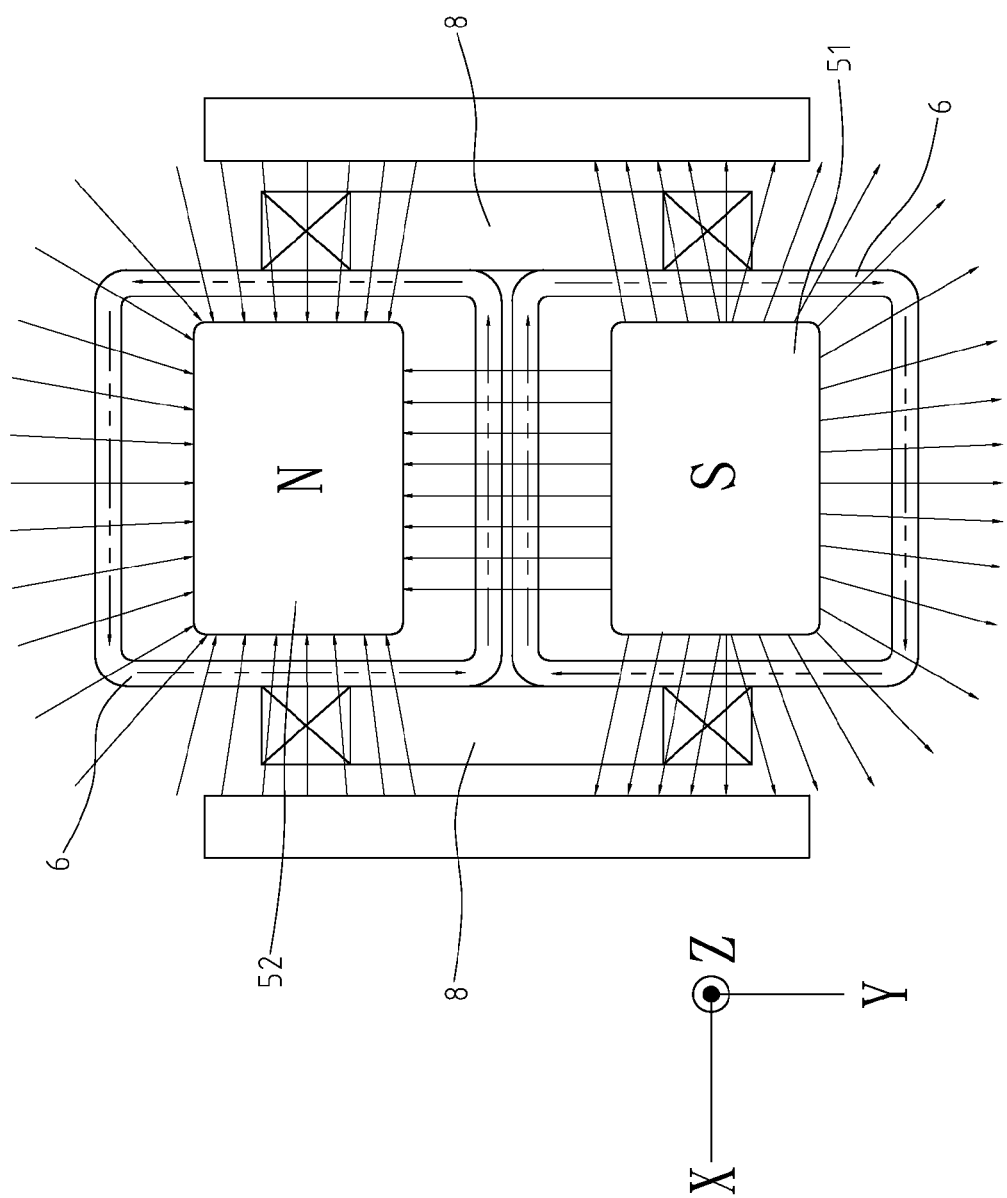
FIG. 6 shows a schematic view of the directions of electric current of the focusing coil and magnetic field.

FIG. 6 shows a schematic view of the directions of electric current of the focusing coil and magnetic field. The arrows surrounding permanent magnet sets 51, 52 indicate the electrical current direction of focusing coil 6. The arrows extending from permanent magnet set 51 and pointing to permanent magnet set 52 are the magnetic field direction. According to Fleming's left-hand rule, the movement direction of focusing coil 6 is Z as indicated in FIG. 6, perpendicular to the paper. This is also the movement direction of lens holder 4 caused by the amplitude and the direction of the electrical current flowing through focusing coil 6.

Figure 7:
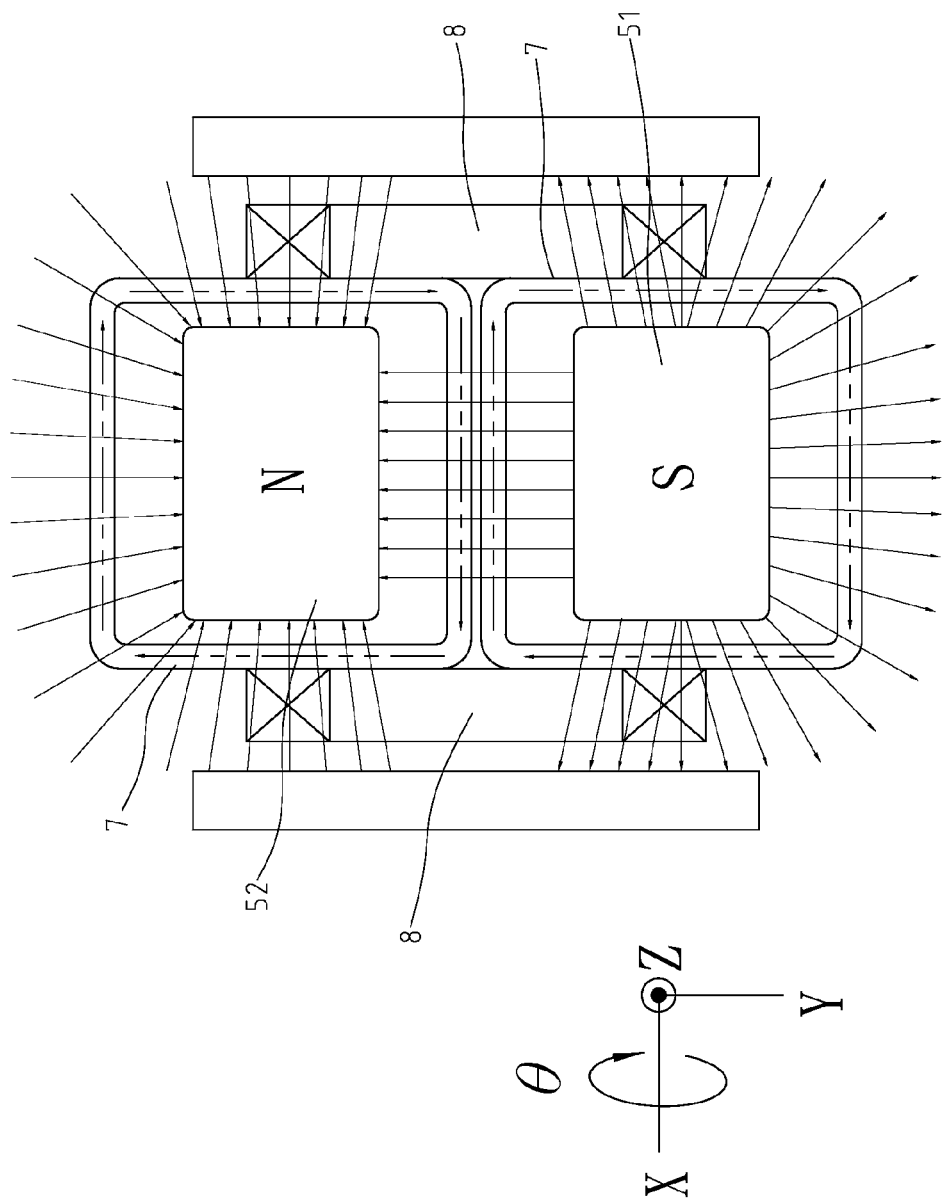
FIG. 7 shows a schematic view of the directions of electric current of the tilting coil and magnetic field.

FIG. 7 shows a schematic view of the directions of electric current of the tilting coil and magnetic field. The arrows surrounding permanent magnet sets 51, 52 indicate the electrical current direction of tilting coil 7. The arrows extending from permanent magnet set 51 and pointing to permanent magnet set 52 are the magnetic field direction. According to Fleming's left-hand rule, the movement direction of tilting coil 7 is θ as indicated in FIG. 7, rotating around X axis. This is also the movement direction of lens holder 4 caused by the amplitude and the direction of the electrical current flowing through tilting coil 7.

Figure 8:
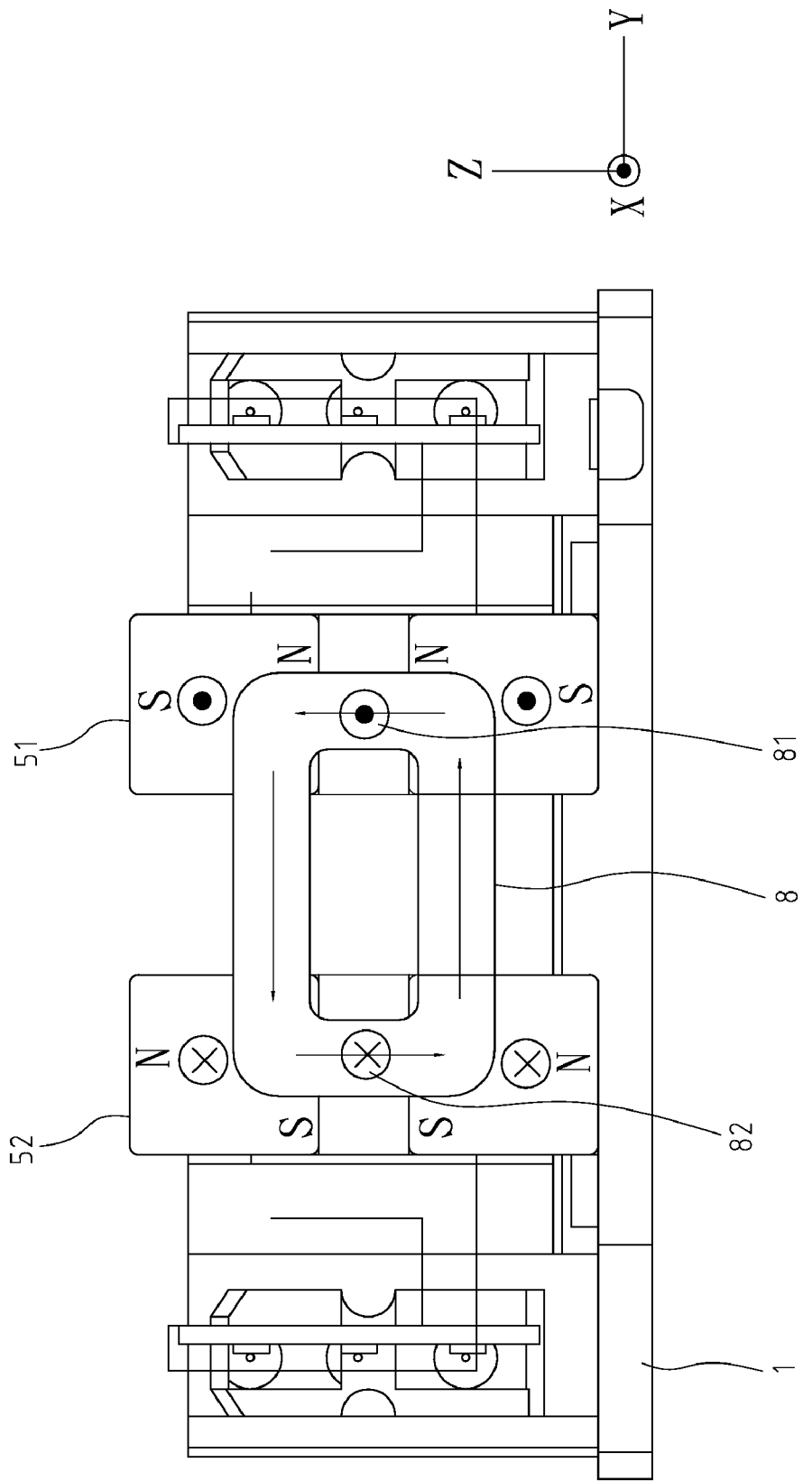
FIG. 8 shows a schematic view of the directions of electric current of the tracking coil and magnetic field.

FIG. 8 shows a schematic view of the directions of electric current of the tracking coil and magnetic field. The arrows flowing along tracking coil 8 indicate the electrical current direction of tracking coil 8. The arrows 81, 82 extending from permanent magnet set 51 and pointing to permanent magnet set 52 are the magnetic field direction. According to Fleming's left-hand rule, the movement direction of tracking coil 8 is Y as indicated in FIG. 8, parallel to the paper and moving left and right. This is also the movement direction of lens holder 4 caused by the amplitude and the direction of the electrical current flowing through tracking coil 8.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An actuator for an optical pickup, for moving an object in a first direction, a second direction, and a third direction, said actuator comprising:

a first permanent magnet set having a first middle yoke sandwiched between two magnets with two S-poles located immediately adjacent to said first middle yoke, and a top N-pole and a bottom N-pole located respectively at two opposite ends of said first permanent magnet set;

a second permanent magnet set having a second middle yoke sandwiched between two magnets with two N-poles located immediately adjacent to said second middle yoke, and a top S-pole and a bottom S-pole located respectively at two opposite ends of said second permanent magnet set;

a focusing coil, connected to said object and placed on an outer circumference of said first and second permanent magnet sets, for moving said object in said first direction by controlling an amplitude and direction of electrical current flowing through said focusing coil;

a tilting coil, connected to said object and placed on the outer circumference of said first and second permanent magnet sets, for moving said object in said second direction by controlling an amplitude and direction of electrical current flowing through said tilting coil; and a tracking coil, connected to said object and placed on the outer circumference of said first and second permanent magnet sets, for moving said object in said third direction by controlling an amplitude and direction of electrical current flowing through said tracking coil;

wherein said first and second permanent magnet sets are placed on a bottom yoke and positioned next to each other with a small space in between, and said top and bottom N-poles of said first permanent magnet set are next to said top and bottom S-poles of said second permanent magnet set for generating magnetic fields, and said actuator generates repelling and attracting forces to move said object in said first direction, said second direction, and said third direction independently.

2. The actuator as claimed in claim 1, wherein said first direction is a focus direction.

3. The actuator as claimed in claim 1, wherein said second direction is a tilt direction.

4. The actuator as claimed in claim 1, wherein said third direction is a track direction.

5. The actuator as claimed in claim 3, wherein said tilt direction rotates around an axis perpendicular to both said first direction and said third direction.

6. The actuator as claimed in claim 1, wherein said object is a lens holder.

* * * * *